United States Patent [19]

Boyd, Sr.

[11] 4,046,345
[45] Sept. 6, 1977

[54] RETENTIVE BASE FOR SHIPPING CASK

[75] Inventor: George F. Boyd, Sr., Duenweg, Mo.

[73] Assignee: Tri-State Motor Transit Company, Duenweg, Mo.

[21] Appl. No.: 600,816

[22] Filed: July 31, 1975

[51] Int. Cl.² ............................................. A47G 23/02
[52] U.S. Cl. .................................. 248/154; 248/310; 248/316 R
[58] Field of Search ............... 248/154, 149, 23, 119, 248/310, 311, 314, 315, 316 R, 316 C, 499, 44, 38, DIG. 7; 105/469, 471, 472, 473; 285/189; 403/344; 52/298, 704; 126/315; 292/256.67

[56] References Cited

U.S. PATENT DOCUMENTS

| 952,655 | 3/1910 | Wagner | 248/44 |
|---|---|---|---|
| 1,288,839 | 12/1918 | Conrad et al. | 248/154 |
| 1,494,234 | 5/1924 | Gossett | 126/315 |
| 1,778,823 | 10/1930 | Anderson | 248/310 |
| 2,526,238 | 10/1950 | Kendall | 292/256.67 |
| 2,876,276 | 3/1959 | Melton | 248/314 |
| 2,911,180 | 11/1959 | Dunagan et al. | 248/310 |
| 3,239,175 | 3/1966 | Seibel | 248/154 |
| 3,563,502 | 2/1971 | Dayson | 52/298 |

Primary Examiner—Robert A. Hafer
Attorney, Agent, or Firm—Schmidt, Johnson, Hovey & Williams

[57] ABSTRACT

A retentive base for large, heavy shipping casks of the type used to transport radioactive or nuclear material, the base including a plate adapted to be secured in a horizontal position on the bed of a supporting vehicle and a ring carried by the plate and having a vertical wall perpendicular to the plate, the cask being confined within the ring, there being engaging posts within the confines of the ring, and means for shifting the ring and certain of the posts carried thereby to retentively engage the cask and prevent movement thereof during transportation.

8 Claims, 4 Drawing Figures

U.S. Patent    Sept. 6, 1977    4,046,345
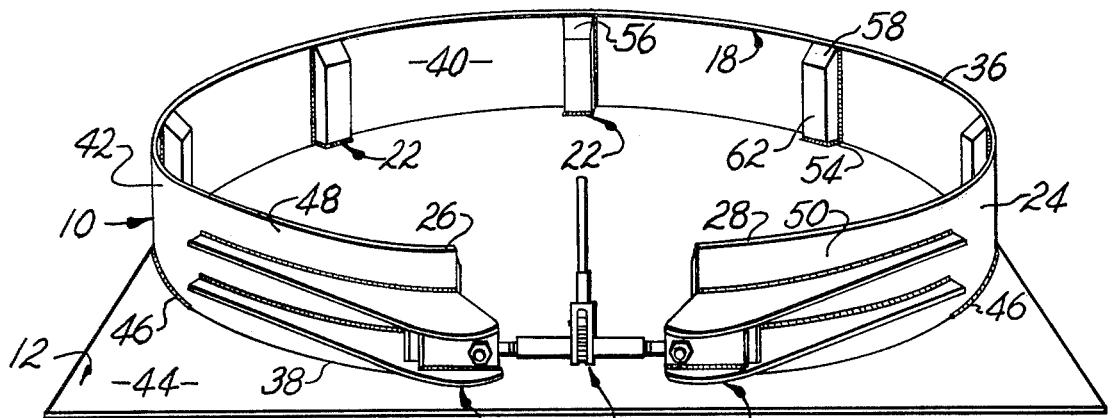
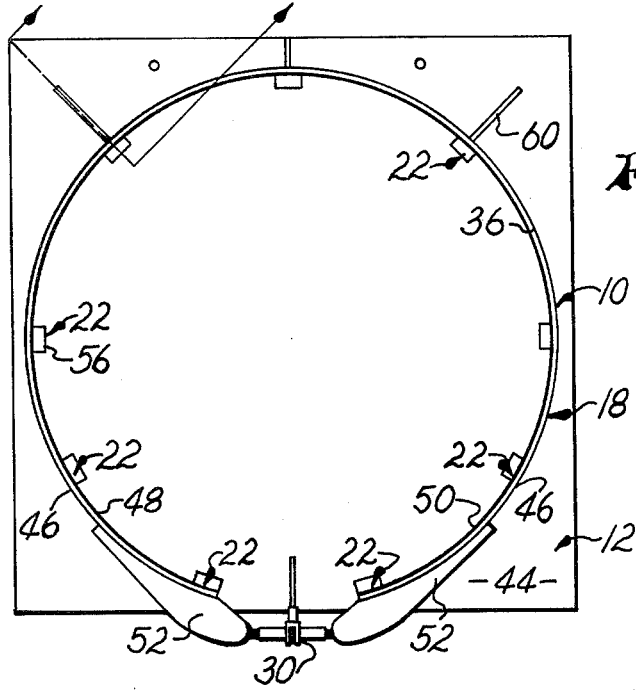
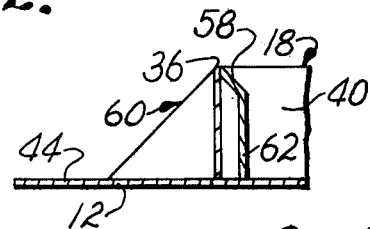
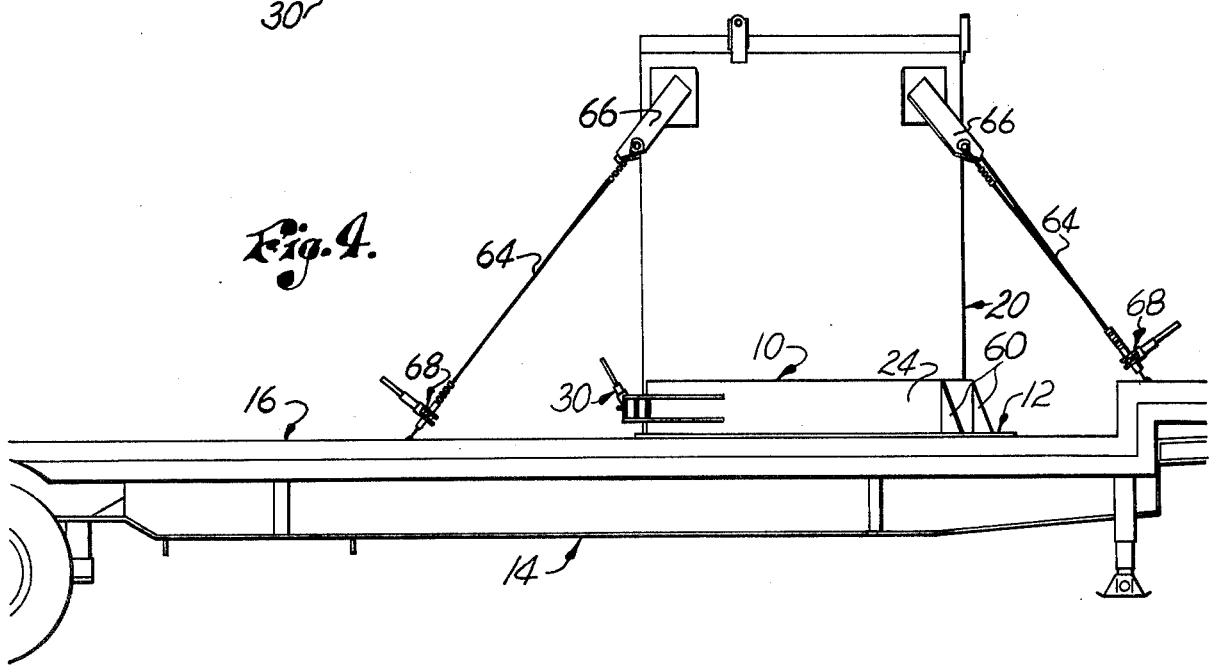

RETENTIVE BASE FOR SHIPPING CASK

It is the primary object of this invention to provide a retentive base for large and heavy shipping casks of the type which are conventionally used to transport radioactive or nuclear materials. Such materials must be transported in a safe and secure manner and when carried by vehicle or railcar it is desirable to insure that the casks are adequately and securely retained with respect to the transporting vehicle. To this end, there is provided, in the present invention, a baseplate which is secured to the bed of a supporting vehicle such as, for instance, a truck trailer or railcar, the horizontal plate having affixed thereto a ring, the ring having a vertical wall in perpendicular relationship to the plate, the shipping cask being received within the confines of the ring.

Yet another important object of the invention is to provide a retentive base wherein the ring such surrounds the shipping cask is transversely split whereby to present a pair of opposed free end lips, the lips being shiftable toward and away from each other whereby to adjust the ring into tight circumscribing engagement with the bottom of the cask.

Yet another important aim of the invention is to provide a retentive base wherein the ring has secured thereto a plurality of posts within the confines of the ring, each of the posts, which are spaced at predetermined intervals along the interior of the ring, having an upper and lower end, the upper end of each post being inclined inwardly and downwardly from the sidewall of the ring whereby to facilitate insertion of the cask within the confines of the ring during loading operations.

Other objects of the invention will become apparent from the following specification and accompanying drawing, wherein:

FIG. 1 is a perspective view of the retentive base for shipping casks;

FIG. 2 is a top plan view thereof;

FIG. 3 is a sectional view taken along line 3—3 of FIG. 2; and

FIG. 4 is a side elevational view thereof showing the retentive base on a drop-deck truck trailer with the cask therewithin and fully secured for purposes of transportation.

The retentive base 10 is primarily fabricated from relatively heavy metal, such as steel or the like, and includes as its primary components, a plate 12 which is flat and which is secured to the bed of the vehicle which is to carry the base and the cask therewithin. Such vehicle may be in the form of a drop-deck truck trailer 14 such as illustrated in FIG. 4 of the drawing, a railroad flatcar or other suitable transporting vehicle which is provided with a bed 16 to receive the retentive base 10. The base 10 also includes a ring 18 which is carried by the plate 12 in a manner which will be hereinafter described in detail, the ring being of sufficient size to receive the shipping cask 20. The cask 20 is of the type conventionally used to transport radioactive or nuclear materials in safety, such cask being provided with lead walls and, therefore, being of substantial weight in order to permit safe shipment of the materials which are carried thereby. The cask 20 is normally cylindrical in configuration whereby to be readily received within the confines of the ring 18 and rest upon the plate 12 and ultimately bed 16 of the trailer such as 14.

The ring 18 is provided with a plurality of spaced-apart, upstanding posts 22 within the confines thereof. Also, ring 18 is split transversely throughout the width of its sidewall 24 whereby to present a pair of opposed free end lips 26 and 28. Suitable turnbuckle type mechanism, such as a ratchet binder 30 interconnects the free end lips 26 and 28 for purposes which will be hereinafter apparent, such binder or turnbuckle 30 being coupled with the free end lips through corresponding bracket assemblies 32 and 34 respectively.

The sidewall 24 of ring 18 presents an upper edge 36 and a lower edge 38 as well as an inner face 40, and an outer face 42. The lower edge 38 of ring 18 is fixedly secured to the upper face 44 of plate 12 as by welding or the like, throughout the major portion of said lower edge 38. The affixing means, such as weld 46 however, does not completely circumscribe the lower edge 38 of the ring 18 but rather terminates short of the free end lips 26 and 28 whereby there is presented, adjacent each of said free end lips 26 and 28, a length 48 and 50 corresponding to each of the free end lips 26 and 28 respectively. Said lengths 48 and 50 are unaffixed to plate 12 whereby to permit movement of said lengths upon operation of the ratchet assembly 30.

The brackets 32 and 34 are carried by lengths 48 and 50 respectively, it being noted that the arms 52 of each of said brackets, terminate substantially coincident with the termination of weld 46.

The posts 22 which are carried within the confines of ring 18 are spaced apart at predetermined intervals whereby to be positioned in such a manner as to engage the cask 20 at spaced points thereabout to insure adequate retention of the cask 20 within the ring 18. In the embodiment of the invention chosen for illustration, there are a total of nine posts shown within the confines of ring 18. Of such posts, those carried by inner face 40 of ring 18 along the major portion thereof which is secured to upper face 44 of plae 12, are likewise secured to plate 12 on its upper face as by welding 54, and the posts which are carried by the lengths 48 and 50 of the ring 18 which are free, are not secured to the upper face 44 of plate 12 whereby such posts may be moved with said lengths 48 and 50. Thus, viewing FIG. 2 for instance, there are five posts which are affixed not only to the inner surface of ring 18, but also to the upper face 44 of plate 12 and serve to secure, in addition to welding 46, the ring 18 to plate 12. However, the pair of posts on each side of the ratchet binder 30, viewing FIG. 2, are free from attachment to the upper face 44 of plate 12 and thus are free to move with the lengths 48 and 50 of the ring 18 to which they are secured.

It is to be noted that the posts each have an upper and a lower end, and in the case of those which are secured to the plate 12, the lower end is welded as at 54 to the upper face 44 of plate 12. In the case of the posts which are free from attachment to the plate 12, the lower ends are not secured to upper face 44. In each instance, however, the upper ends 56 of the posts are inclined inwardly and downwardly from the upper edge 36 of ring 18 toward the center of the ring as by provision of a beveled surface 58, said beveled surfaces 58 on the upper ends 56 of each of the posts being alike in angular configuration.

In order to further insure the secure attachment of ring 18 to upper face 44 of plate 12, a plurality of gussets 60 are provided at spaced locations about the outer wall 42 of the ring 18, said gussets being secured, as by welding, to said outer wall and also secured to the upper face 44 of plate 12, all as is clearly shown in FIG. 3 of the drawing.

When the retentive base is to be utilized for transportation of a shipping cask such as 20, the baseplate 12 is initially secured to the bed 16 of the transportating vehicle, such as 14, the ring 18 having previously been secured to the upper face 44 of the plate 12 in the manner hereinafter above described.

The ratchet mechanism 30 is then actuated whereby to move the opposed free end lips 26 and 28 away from each other, such movement being permitted by the provision of lengths 48 and 50 of the ring 18 which are free from attachment to the baseplate 12, it being noted that the remainder of the ring 18 is retained in its fixed position with respect to plate 12 by virtue of the attachment of the lower edge 38 thereof by welding 46.

Once the ring has been expanded, as above described, the cask 20 may be lowered to within the confines thereof by a suitable overhead crane or other lifting mechanism. It will be noted that as the cask is lowered into the confines of the expanded ring 18, any damage to the upper edge 36 of the ring by the cask, is prevented by virtue of the upper ends 56 of the post 22 being provided with the bevel 58, said inwardly inclined bevel serving to guide the cask into position within the confines of the ring 18. Thus, the cask 20 is securely centered within the ring 18 with the exterior wall of the cask 20 being in engagement with the front wall 62 of the posts 22. Initially, the cask 20 and more exactly, its exterior wall, would be in engagement with the front wall 62 of the posts 22 which are secured to the ring 18 and to the plate 12.

However, once the cask is initially positioned in the manner above described, the ratchet binder mechanism 30 is actuated whereby to draw the free end lips 26 and 28 toward one another as by moving the lengths 48 and 50 of the ring 18. As this is accomplished, the front walls 62 of the posts which are not secured to the baseplate 12 and which, therefore, move with said lengths 48 and 50, will be brought into engagement with the exterior surface of the cask 20.

Once the foregoing has been accomplished, the cask 20 is securely seated upon the upper face 44 of plate 12 and is retained against any movement by virtue of the engagement of the exterior wall of the cask 20 with the front walls 62 of the posts 22. Tight, retentive engagement is insured by virtue of the fact that the ratchet binder 30 is utilized to draw the lips 26 and 28 as far together as is possible and to thus move lengths 48 and 50 and the posts 22 which are carried thereby, into a position whereby the front walls of said posts are in tight, engaging and retentive engagement with the exterior wall of cask 20.

If desired, and once the cask 20 has been seated and secured within the confines of ring 18 as above described, additional guy wires, such as 64, may be coupled with arms such as 66, which arms are conventionally provided adjacent the top of the cask 20. The guy wires 62 may be utilized with a suitable turnbuckle or ratchet mechanism, such as 68, to insure that the cask 20 is tightly held down within the confines of the ring 18 and upon the bed 16 of the supporting vehicle such as 14.

Thus, there is provided a retentive base for shipping casks, which base securely and safely holds the cask on the bed of a transporting vehicle to insure the safe transportation of the cask from one point to another, the retentive assembly being readily placed into position in surrounding relationship to the cask when initial loading takes place. When the cask 20 is to be unloaded, the ratchet binder or turnbuckle mechanism 30 is actuated whereby to permit lips 26 and 28 to move away from one another and thus bring the front wall 62 of the free posts 22 out of engagement with the exterior wall of the cask 20 and permit ready removal of the cask from within the confines of the ring 18 of the retentive base 10.

Having thus described the invention, what is claimed as new and desired to be secured by Letters Patent is:

1. A retentive base for a shipping cask comprising:
a plate adapted to be secured in a horizontal position on the bed of a supporting vehicle;
a ring carried by said plate and receiving said cask within the confines thereof, said ring having a vertical sidewall perpendicular to said plate, said sidewall being transversely split whereby to present a pair of opposed, free end lips, said sidewall having an upper and a lower edge, the major portion of said lower edge of said sidewall being directly affixed to said plate;
means on said ring and within the confines thereof for retentively engaging the cask; and
means for shifting certain of said engaging means into and out of engagement with said cask.

2. A retentive base for a shipping cask as claimed in claim 1, a length of said sidewall adjacent each of said end lips having its lower edge unaffixed to said plate whereby to permit shifting movement of said lengths on the sidewall.

3. A retentive base for a shipping cask as claimed in claim 2, there being means interconnecting said end lips for shifting the same toward and away from each other and therefore said engaging means into and out of engagement with said cask.

4. A retentive base for a shipping cask as claimed in claim 3, said engaging means being in the form of a plurality of posts secured to said ring at spaced positions on the sidewall thereof within the confines of the ring.

5. A retentive base for a shipping cask as claimed in claim 4, certain of said posts being secured to said ring along said lengths of the sidewall, the remainder of the posts being secured to said major portion of the sidewall.

6. A retentive base for a shipping cask as claimed in claim 5, said posts each having an upper and a lower end, the upper end of each post being inclined inwardly and downwardly from said sidewall toward the center of the ring.

7. A retentive base for a shipping cask as claimed in claim 6, there being a plurality of gussets interconnecting said ring with said plate exteriorly of the confines of the ring.

8. A retentive base for a shipping cask as claimed in claim 7, there being a bracket on each of said lengths, said interconnecting means being coupled with said brackets.

* * * * *